United States Patent
Kitamoto

(10) Patent No.: US 12,523,709 B2
(45) Date of Patent: Jan. 13, 2026

(54) GROUND FAULT DETERMINATION SYSTEM AND GROUND FAULT DETERMINATION METHOD

(71) Applicant: HONDA MOTOR CO., LTD., Tokyo (JP)

(72) Inventor: Ryota Kitamoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 521 days.

(21) Appl. No.: 18/114,373

(22) Filed: Feb. 27, 2023

(65) Prior Publication Data

US 2023/0305078 A1    Sep. 28, 2023

(30) Foreign Application Priority Data

Mar. 23, 2022    (JP) .................. 2022-046199

(51) Int. Cl.
*H01M 8/249*    (2016.01)
*G01R 31/52*    (2020.01)

(52) U.S. Cl.
CPC ............ *G01R 31/52* (2020.01); *H01M 8/249* (2013.01); *H01M 2250/20* (2013.01)

(58) Field of Classification Search
CPC .... H01M 8/249; H01M 2250/20; G01R 31/52
USPC ................................................ 429/400, 535
See application file for complete search history.

(56) References Cited

U.S. PATENT DOCUMENTS

| | | | | |
|---|---|---|---|---|
| 5,760,488 | A | * | 6/1998 | Sonntag ............ H01M 8/04992 307/9.1 |
| 8,338,046 | B2 | * | 12/2012 | Miyajima et al. ........................... H01M 8/04537 429/444 |
| 2004/0202901 | A1 | * | 10/2004 | Logan et al. ..... H01M 8/04679 429/431 |
| 2015/0188160 | A1 | * | 7/2015 | Lee .................... H01M 8/04992 429/432 |
| 2018/0167029 | A1 | * | 6/2018 | Sano et al. .............. H02S 50/00 |

FOREIGN PATENT DOCUMENTS

JP       2014-195372 A      10/2014
WO     WO 2019044979 A1 *  3/2019 ............ H02M 3/093

OTHER PUBLICATIONS

Machine translation of WO 2019044979 A1 (Year: 2019).*

* cited by examiner

*Primary Examiner* — Kevin P Kerns
(74) *Attorney, Agent, or Firm* — Carrier, Shende & Associates P.C.; Joseph P. Carrier; Fulchand P. Shende

(57) ABSTRACT

A ground fault determination system includes an acquisition unit that acquires the degree of deterioration of a plurality of fuel cell stacks connected in parallel with each other and connected to an inverter, a ground fault detection unit that detects insulation resistance between the inverter and the plurality of fuel cell stacks, a first determination unit that determines, when the deterioration of each fuel cell stack has not yet progressed, whether there is a ground fault with all the fuel cell stacks all at once, and a second determination unit that determines in turn, when the deterioration of at least one fuel cell stack has progressed, whether there is a ground fault with each fuel cell stack.

6 Claims, 8 Drawing Sheets

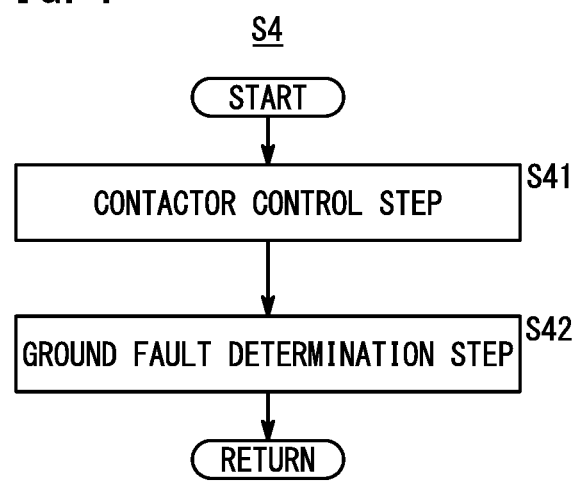

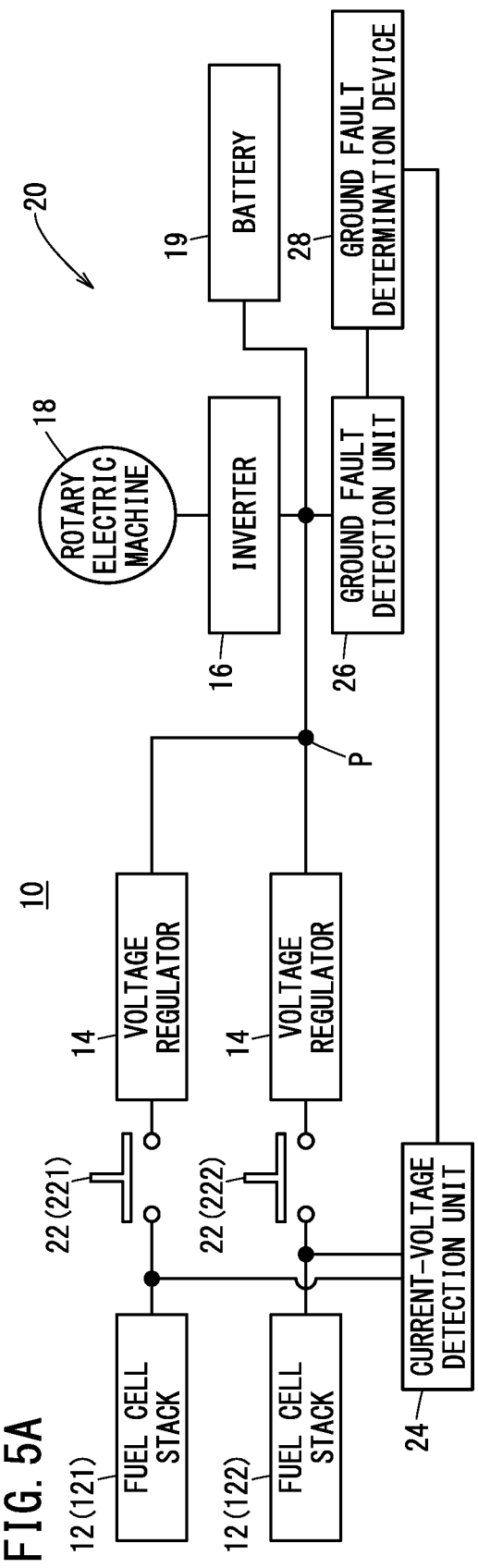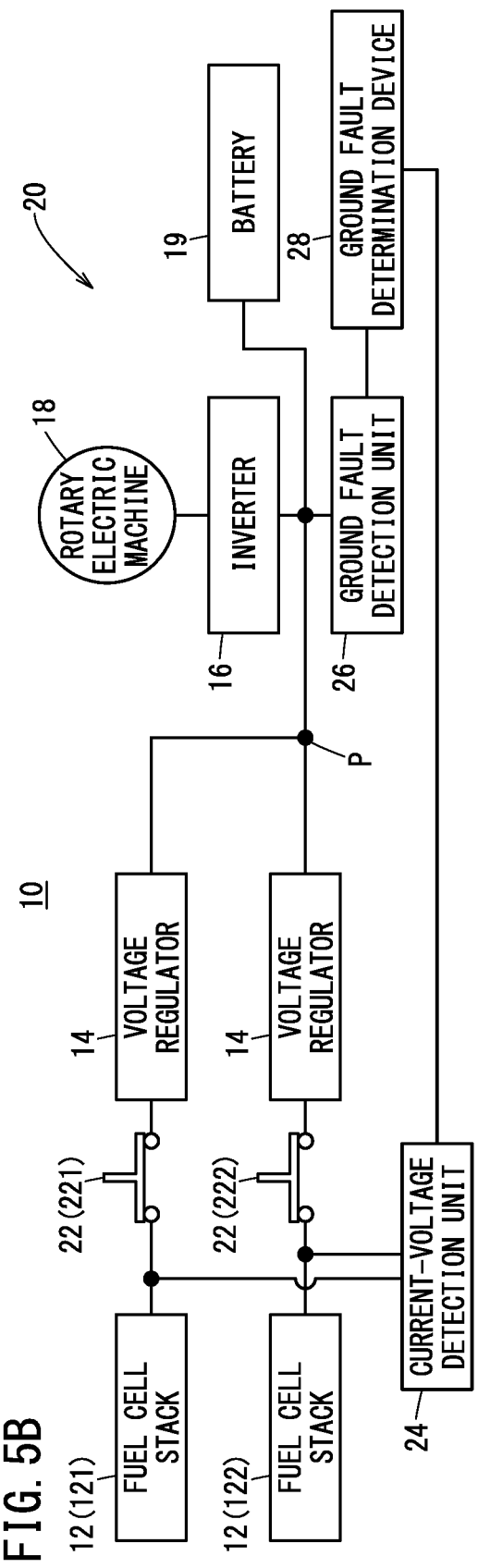

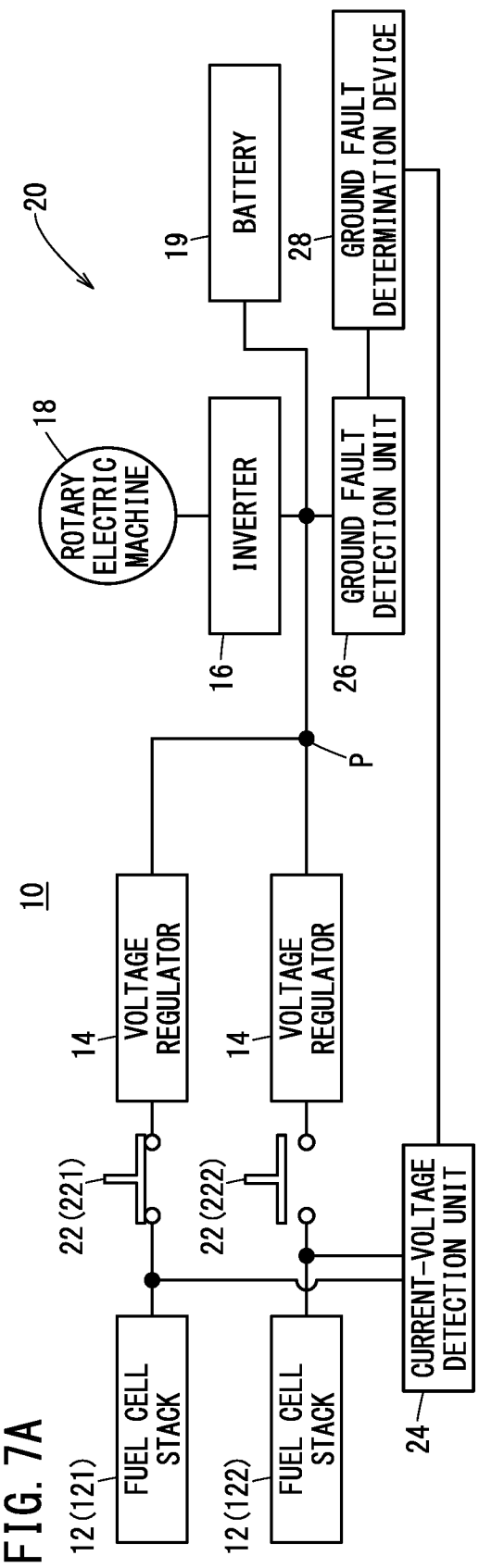
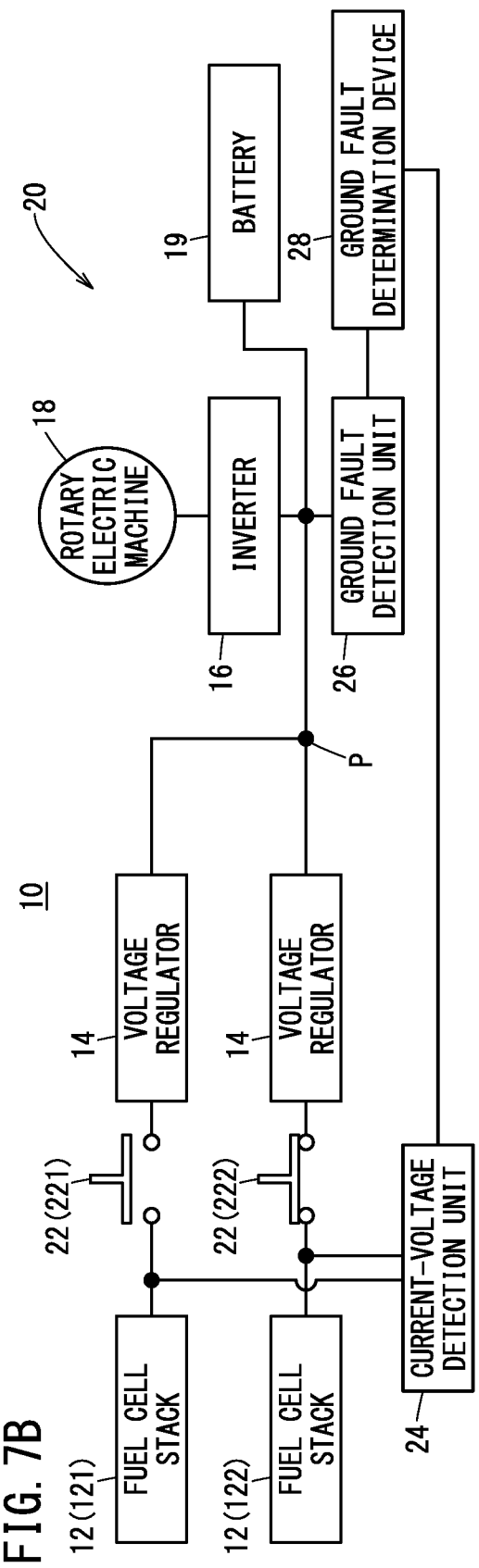

GROUND FAULT DETERMINATION SYSTEM AND GROUND FAULT DETERMINATION METHOD

CROSS-REFERENCE TO RELATED APPLICATIONS

This application is based upon and claims the benefit of priority from Japanese Patent Application No. 2022-046199 filed on Mar. 23, 2022, the contents of which are incorporated herein by reference.

BACKGROUND OF THE INVENTION

Field of the Invention

The present invention relates to a ground fault determination system and a ground fault determination method for determining whether there is a ground fault with a plurality of fuel cell stacks of a fuel cell vehicle connected in parallel.

Description of the Related Art

In recent years, there has been research and development on fuel cells that contribute to energy efficiency to ensure that more people have access to affordable, reliable, sustainable and modern energy.

For example, JP 2014-195372 A discloses a fuel cell vehicle. The fuel cell vehicle is provided with a fuel cell stack (fuel cell), an inverter, and a rotary electric machine (motor). The fuel cell stack supplies electric current to the rotary electric machine via the inverter. The rotary electric machine is driven by using the supplied electric current. The fuel cell vehicle runs according to the drive of the rotary electric machine.

The fuel cell vehicle of JP 2014-195372 A further includes a ground fault sensor. The ground fault sensor outputs a detection signal corresponding to insulation resistance between the fuel cell stack and the inverter. On the basis of this detection signal, it is possible to determine whether there is the ground fault with the fuel cell stack.

SUMMARY OF THE INVENTION

Here, if a plurality of fuel cell stacks connected in parallel are mounted in a fuel cell vehicle, a large current is supplied to the inverter. As a result, insulation resistance decreases and thus it is possible that the presence or absence of the ground fault cannot be accurately determined. JP 2014-195372 A does not consider these problems at all.

In view of the above, it is an object of the art relating to fuel cells to determine accurately and as quickly as possible whether there is the ground fault with a plurality of fuel cell stacks connected in parallel.

An object of the present invention is to solve the aforementioned problems.

The first aspect of the present invention is a ground fault determination system that determines whether there is a ground fault with a plurality of fuel cell stacks connected in parallel with each other and connected to an inverter, the ground fault determination system comprising: an acquisition unit that acquires deterioration information indicating a degree of deterioration of each of the plurality of fuel cell stacks; a ground fault detection unit that detects insulation resistance between the inverter and the plurality of fuel cell stacks; and a ground fault determination unit that determines whether there is the ground fault, based on a detection result of the ground fault detection unit, wherein the ground fault determination unit includes: a first determination unit that performs a first determination process in a case where the degree of deterioration of all the plurality of fuel cell stacks is not more advanced than a predetermined degree of deterioration; and a second determination unit that performs a second determination process in a case where the degree of deterioration of at least one of the plurality of fuel cell stacks is more advanced than the predetermined degree of deterioration, the first determination process is a process of determining whether there is the ground fault with all the fuel cell stacks, based on a detection result of the ground fault detection unit acquired while all the fuel cell stacks are electrically connected to the inverter, and the second determination process is a process of determining, for each of the fuel cell stacks, whether there is the ground fault, based on a detection result of the ground fault detection unit acquired when each of the plurality of the fuel cell stacks is electrically connected to the inverter in turn.

The second aspect of the present invention is a ground fault determination method in which a computer determines whether there is a ground fault with a plurality of fuel cell stacks connected in parallel with each other and connected to an inverter, based on a detection result of a ground fault detection unit that detects insulation resistance between the inverter and the plurality of fuel cell stacks, the ground fault determination method comprising: an acquisition step of acquiring deterioration information indicating a degree of deterioration of each of the plurality of fuel cell stacks; a first determination step of performing a first determination process in a case where the degree of deterioration of all the plurality of fuel cell stacks is not more advanced than a predetermined degree of deterioration; and a second determination step of performing a second determination process in a case where the degree of deterioration of at least one of the plurality of fuel cell stacks is more advanced than the predetermined degree of deterioration, wherein the first determination process is a process in which the computer determines whether there is the ground fault with all the fuel cell stacks, based on a detection result of the ground fault detection unit acquired while all the fuel cell stacks are electrically connected to the inverter, and the second determination process is a process in which the computer determines, for each of the fuel cell stacks, whether there is the ground fault, based on a detection result of the ground fault detection unit acquired when each of the plurality of fuel cell stacks is electrically connected to the inverter in turn.

According to the present invention, it is possible to determine accurately and as quickly as possible whether there is the ground fault with a plurality of fuel cell stacks.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 4 is a flowchart illustrating a flow of a first determination process performed in a first determination step.

FIG. 5A is a diagram showing a state of each contactor before a contactor control step is performed. FIG. 5B is a diagram showing a state of each contactor after the contactor control step is performed.

FIG. 7A is a diagram showing a state of each contactor after the contactor control step (first time) is performed.

FIG. 7B is a diagram showing a state of each contactor after the contactor control step (second time) is performed.

DETAILED DESCRIPTION OF THE INVENTION

Embodiments

Figure 1:
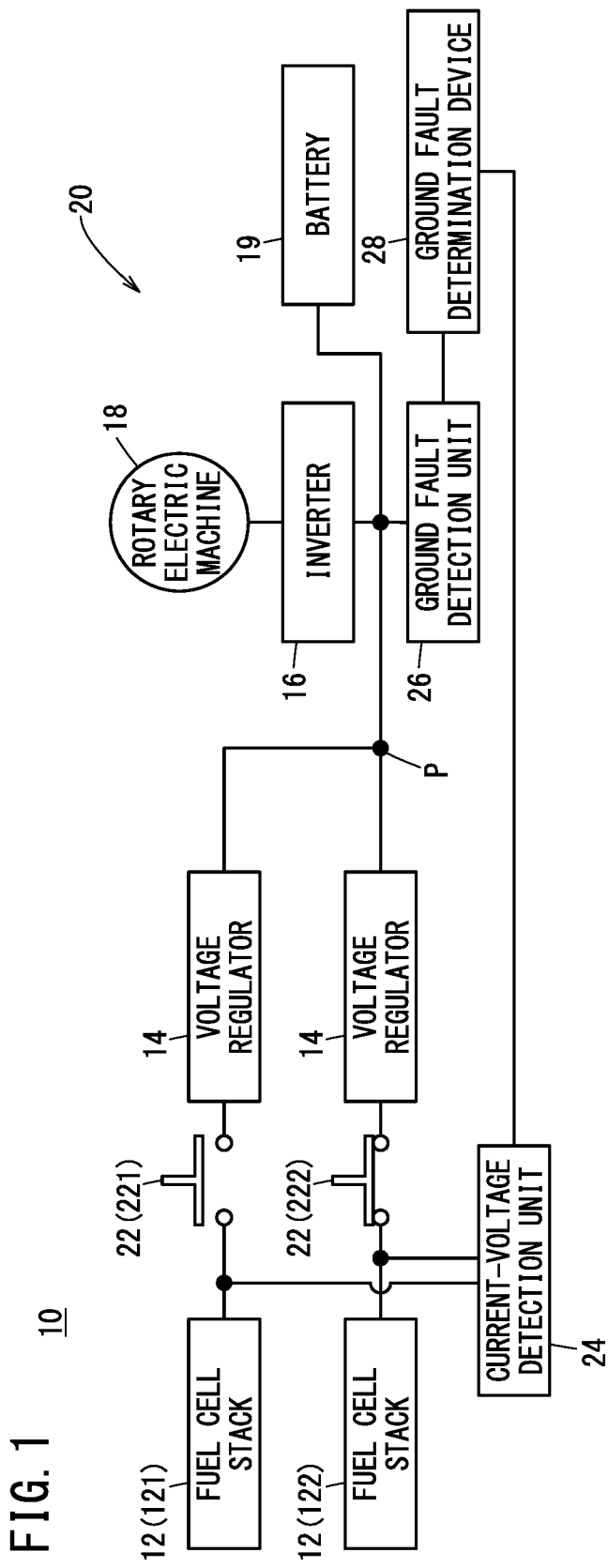
FIG. 1 is a block diagram of a fuel cell vehicle according to an embodiment.

FIG. 1 is a block diagram of a fuel cell vehicle 10 according to an embodiment.

The fuel cell vehicle 10 includes a plurality of fuel cell stacks 12, a plurality of voltage regulators 14, an inverter 16, a rotary electric machine 18, a battery 19, and a ground fault determination system 20.

Each of the plurality of fuel cell stacks 12 is a power generating device that generates power by utilizing chemical reactions between hydrogen and oxygen. The plurality of fuel cell stacks 12 are connected to different voltage regulators 14 in series. The plurality of fuel cell stacks 12 output power to the voltage regulators 14 to which the plurality of fuel cell stacks 12 are connected. The power output from each fuel cell stack 12 is DC power.

The number of fuel cell stacks 12 provided to the fuel cell vehicle 10 shown in FIG. 1 is two. However, three or more fuel cell stacks 12 may be provided to the fuel cell vehicle 10.

Each of the plurality of voltage regulators 14 is a mechanical component for regulating the current (voltage) input from the corresponding fuel cell stack 12. Each of the plurality of voltage regulators 14 includes, for example, an FCVCU (boost converter for fuel cells).

The plurality of voltage regulators 14 are connected in parallel with each other and connected to the inverter 16. Thus, the plurality of fuel cell stacks 12 are connected in parallel with respect to the inverter 16 via the plurality of voltage regulators 14. A point P in FIG. 1 is a merging point where the output currents from all the fuel cell stacks 12 merge together.

The inverter 16 is connected to a plurality of voltage regulators 14 and the rotary electric machine 18. The inverter 16 receives DC power from a plurality of fuel cell stacks 12 via a plurality of voltage regulators 14. The inverter 16 converts the input DC power into AC power and outputs the AC power to the rotary electric machine 18.

The rotary electric machine 18 rotates using the AC power input from the inverter 16. Rotational force of the rotary electric machine 18 is transmitted to drive wheels of the fuel cell vehicle 10 through a transmission mechanism such as a transmission. As a result, the drive wheels rotate and the fuel cell vehicle 10 runs. The transmission mechanism and the drive wheels are omitted in the drawings.

The rotary electric machine 18 may perform, for example, regenerative braking in order to decelerate the fuel cell vehicle 10. In this case, the rotary electric machine 18 generates power using the rotational force of the drive wheels.

The battery 19 is a secondary battery connected between the inverter 16 and the plurality of fuel cell stacks 12. The battery 19 stores electric power output from the plurality of fuel cell stacks 12 or the rotary electric machine 18 as required. The battery 19 supplies the stored electric power to the rotary electric machine 18 as needed. The electric power of the battery 19 is supplied to the rotary electric machine 18 via the inverter 16.

The ground fault determination system 20 includes a plurality of contactors 22 (221, 222), a current-voltage detection unit 24, a ground fault detection unit 26, and a ground fault determination device 28.

The plurality of contactors 22 are disposed between the inverter 16 and the plurality of fuel cell stacks 12. Here, at least one contactor 22 is installed corresponding to each of the plurality of fuel cell stacks 12. A plurality of contactors 22 may correspond to one fuel cell stack 12 (see also FIG. 8). Each of the plurality of contactors 22 is connected to a corresponding fuel cell stack 12 in series.

With respect to the direction in which the output current of the fuel cell stack 12 flows, each of the plurality of contactors 22 illustrated in FIG. 1 is disposed upstream of the voltage regulators 14. However, the contactors 22 may be provided downstream of the voltage regulators 14 (see also FIG. 8).

Each of the plurality of contactors 22 can be switched between an ON state and an OFF state under the control of a ground fault determination device 28. A more detailed description of the ground fault determination device 28 will be given later.

In the ON state, the contactor 22 connects the inverter 16 and the corresponding fuel cell stack 12. The contactor 222 illustrated in FIG. 1 is in an ON state. Each of the plurality of fuel cell stacks 12 can input electric current to the inverter 16 when the corresponding contactor 22 is in the ON state.

While the fuel cell vehicle 10 is running, all the contactors 22 are in an ON state.

In the OFF state, the contactor 22 disconnects the inverter 16 and the corresponding fuel cell stack 12 from each other. The contactor 221 illustrated in FIG. 1 is in an OFF state. Each of the plurality of fuel cell stacks 12 cannot input current to the inverter 16 when the corresponding contactor 22 is in the OFF state.

While the fuel cell vehicle 10 is stopped (ignition is turned off), all the contactors 22 are in an OFF state.

The current-voltage detection unit 24 includes, for example, a plurality of voltage sensors for detecting the voltage of each fuel cell stack 12 and a plurality of current sensors for detecting the current of each fuel cell stack 12. A detection result of the current-voltage detection unit 24 is input to the ground fault determination device 28.

The ground fault detection unit 26 includes, for example, a ground fault sensor for detecting insulation resistance. The ground fault detection unit 26 is connected between the point P and the inverter 16. A detection result of the ground fault detection unit 26 is input to the ground fault determination device 28.

Figure 2:
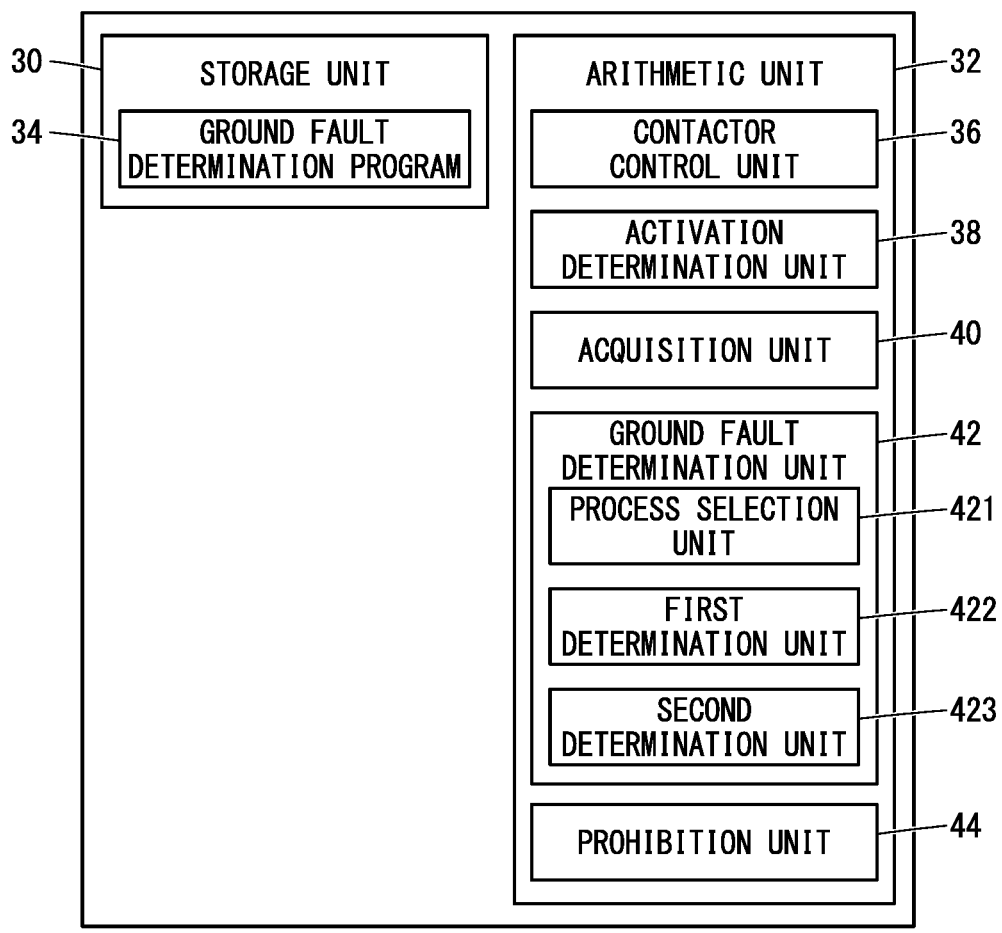
FIG. 2 is a block diagram of a ground fault determination device.

FIG. 2 is a block diagram of the ground fault determination device 28.

The ground fault determination device 28 is a computer that determines whether each of the plurality of fuel cell stacks 12 has the ground fault based on the detection result of the ground fault detection unit 26. The ground fault determination device 28 includes a storage unit 30 and an arithmetic unit 32.

The storage unit 30 includes a storage circuit. The storage circuit includes one or more memories such as a RAM (Random Access Memory) and a ROM (Read Only Memory).

The storage unit 30 stores a ground fault determination program 34. The ground fault determination program 34 is a program for realizing the ground fault determination method according to the present embodiment.

The data stored in the storage unit 30 is not limited to the ground fault determination program 34. The storage unit 30 may store various data as required. Some of the various data stored in the storage unit 30 will be described later.

The arithmetic unit 32 includes a processing circuit. The processing circuit includes, for example, one or more processors. However, the processing circuit of the arithmetic unit 32 may include an integrated circuit such as an ASIC (Application Specific Integrated Circuit) and an FPGA (Field-Programmable Gate Array). Further, the processing circuit of the arithmetic unit 32 may include discrete devices.

The arithmetic unit 32 includes a contactor control unit 36, an activation determination unit 38, an acquisition unit 40, a ground fault determination unit 42, and a prohibition unit (44). The contactor control unit 36, the activation determination unit 38, the acquisition unit 40, the ground fault determination unit 42, and the prohibition unit 44 are realized by the processor of the arithmetic unit 32 executing the ground fault determination program 34.

However, the above-described integrated circuit, discrete device, or the like may realize at least part of the contactor control unit 36, the activation determination unit 38, the acquisition unit 40, the ground fault determination unit 42, and the prohibition unit 44.

The contactor control unit 36 controls the plurality of contactors 22 to switch each of the plurality of contactors 22 between an ON state and an OFF state. The contactor control unit 36 controls the plurality of contactors 22 in response to a request from the ground fault determination unit 42. A more detailed description of the ground fault determination unit 42 will be given later.

The activation determination unit 38 determines whether the fuel cell vehicle 10 has been activated (the ignition has been turned on). The fuel cell vehicle 10 is activated, for example, when an ignition switch provided to the fuel cell vehicle 10 is operated. Therefore, the activation determination unit 38 can determine whether the fuel cell vehicle 10 has been activated based on whether the ignition switch has been operated.

The fuel cell vehicle 10 may be remotely activated. For example, a driver possesses a terminal capable of communicating with the fuel cell vehicle 10. The terminal is, for example, a smartphone. An activation command is transmitted from the terminal to the fuel cell vehicle 10. The fuel cell vehicle 10 may be activated in response to the activation command. In this case, the activation determination unit 38 may determine whether the fuel cell vehicle 10 has been activated based on whether the fuel cell vehicle 10 has received the activation command transmitted from the terminal.

The acquisition unit 40 acquires deterioration information and insulation resistance.

The deterioration information is information indicating the degree of deterioration of each fuel cell stack 12. The acquisition unit 40 acquires the deterioration information based on the current-voltage characteristics of each fuel cell stack 12. That is, the current-voltage characteristics of each fuel cell stack 12 change according to the progress of deterioration of the fuel cell stack 12. Therefore, based on the current-voltage characteristics of each fuel cell stack 12, the progress of deterioration of the fuel cell stack 12 can be estimated.

The current-voltage characteristics of the fuel cell stack 12 is worked out based on the output voltage of the fuel cell stack 12 and the current output from the fuel cell stack 12 in accordance with the output voltage. The acquisition unit 40 calculates the current-voltage characteristics of each fuel cell stack 12 based on the detection result of the current-voltage detecting unit 24 (voltage sensor, current sensor).

The insulation resistance is acquired based on the detection result of the ground fault detection unit 26. The insulation resistance acquired is the insulation resistance between the inverter 16 and the fuel cell stack 12 that is currently electrically connected to the inverter 16. The fuel cell stack 12 currently electrically connected to the inverter 16 is a fuel cell stack 12 connected to the inverter 16 via an on-state contactor 22. A fuel cell stack that is currently disconnected from the inverter 16 by the contactor 22 does not correspond to a fuel cell stack that is currently electrically connected to the inverter 16.

The ground fault determination unit 42 determines whether the ground fault is occurring to each fuel cell stack 12 based on the detection result of the ground fault detection unit 26. That is, the ground fault determination unit 42 determines whether the fuel cell stack 12 has the ground fault based on the detection result of the ground fault detection unit 26. The ground fault determination unit 42 includes a process selection unit 421, a first determination unit 422, and a second determination unit 423.

The process selection unit 421 selects either one of the first determination unit 422 or the second determination unit 423 based on the deterioration information. Here, the process selection unit 421 determines, based on the deterioration information, whether the degree of deterioration of at least one fuel cell stack 12 is more advanced than a predetermined degree of deterioration. The predetermined degree of deterioration may be stored in advance in the storage unit 30.

When the degree of deterioration of all the fuel cell stacks 12 is not more advanced than the predetermined degree of deterioration, the process selection unit 421 calls the first determination unit 422. If the degree of deterioration of at least one fuel cell stack 12 is more advanced than the predetermined degree of deterioration, the process selection unit 421 calls the second determination unit 423.

Based on the first process, the first determination unit 422 determines whether the plurality of fuel cell stacks 12 have the ground fault. The first determination process is a process that determines whether there is the ground fault with all the fuel cell stacks 12 based on the detection result of the ground fault detection unit 26 while all the fuel cell stacks 12 are electrically connected to the inverter 16 (see also FIG. 4).

In order to perform the first determination process, the first determination unit 422 requests the contactor control unit 36 to turn on all the contactors 22. The contactor control unit 36 turns on all the contactors 22 in response to the request from the first determination unit 422.

For example, the first determination unit 422 determines that the ground fault is present when the insulation resistance detected by the ground fault detection unit 26 is equal to or less than a threshold value while all the fuel cell stacks 12 are electrically connected to the inverter 16. That is, the first determination unit 422 determines that all the fuel cell stacks 12 have the ground fault when the insulation resistance detected by the ground fault detection unit 26 is equal to or less than the threshold value while all the fuel cell stacks 12 output current to the inverter 16. The threshold value may be stored in advance in the storage unit 30.

According to the first determination process, the ground fault of all the fuel cell stacks 12 connected in parallel can be checked all at once. Therefore, regardless of the number of fuel cell stacks 12, the ground fault of all fuel cell stacks 12 can be checked in a short time.

The second determination unit 423 determines whether the plurality of fuel cell stacks 12 have the ground fault based on the second process. The second determination process is a process that determines the presence or absence of the ground fault for each fuel cell stack 12 based on the detection result of the ground fault detection unit 26 when each of the plurality of fuel cell stacks 12 are electrically connected to the inverter 16 in turn (see also FIG. 6).

In order to perform the second determination process, (1) the second determination unit 423 requests the contactor control unit 36 to select one of the plurality of fuel cell stacks 12 and turn on only the contactor 22 corresponding to the selected fuel cell stack 12. The contactor control unit 36 appropriately controls the plurality of contactors 22 so that the contactor 22 corresponding to the selected fuel cell stack 12 are brought into an ON state and the contactors 22 corresponding to the unselected fuel cell stacks 12 are brought into an OFF state. Thus, only the selected fuel cell stack 12 among the plurality of fuel cell stacks 12 is electrically connected to the inverter 16.

Subsequently, (2) the second determination unit 423 determines whether the selected fuel cell stack 12 has the ground fault based on the insulation resistance detected when only the selected fuel cell stack 12 is electrically connected to the inverter 16. For example, when the insulation resistance detected by the ground fault detection unit 26 while only the selected fuel cell stack 12 is electrically connected to the inverter 16 is equal to or less than the threshold value, the second determination unit 423 determines that the fuel cell stack 12 has the ground fault.

The second determination unit 423 repeatedly performs the steps (1) and (2) while changing the fuel cell stack 12 to be selected. The order in which the plurality of fuel cell stacks 12 are selected is not particularly limited.

According to the second determination process, even if deterioration of at least one of the plurality of fuel cell stacks 12 progresses, it is possible to accurately determine whether each fuel cell stack 12 has the ground fault.

That is, the insulation resistance of the fuel cell stack 12 decreases as the deterioration of the fuel cell stack 12 progresses. In a case where a plurality of fuel cell stacks 12 are connected in parallel, if insulation resistance of at least one fuel cell stack 12 reduces, insulation resistance detected by the ground fault detection unit 26 while all the fuel cell stacks 12 are electrically connected to the inverter 16 is likely to reduce. As a result, according to the determination method based on the first determination process, there is a possibility that the fuel cell stack 12 without the ground fault could be mistaken as the one with the ground fault. However, according to the second determination process, each fuel cell stack 12 is checked for the ground fault. Therefore, the presence or absence of the ground fault can be accurately determined regardless of the degree of deterioration of each fuel cell stack 12.

Even when the degree of deterioration of all the fuel cell stacks 12 is not more advanced than the predetermined degree of deterioration, if the first determination unit 422 determines that there is a ground fault, the second determination unit 423 determines the presence or absence of the ground fault based on the second determination process.

Thus, when the occurrence of ground fault is suspected while the degree of deterioration of all the fuel cell stacks 12 is not more advanced than the predetermined degree of deterioration, the presence or absence of ground fault can be determined more accurately. Further, it is possible to check which fuel cell stack 12 among the plurality of fuel cell stacks 12 has the ground fault.

When the determination result of the first determination unit 422 is different from the determination result of the second determination unit 423, the ground fault determination unit 42 treats the determination result of the second determination unit 423 as a correct determination result.

Thus, even if the first determination unit 422 makes an erroneous determination, the ground fault determination unit 42 can obtain a correct determination result.

When the first determination unit 422 determines that there is a ground fault and when the second determination unit 423 determines that there is no ground fault, the prohibition unit 44 prohibits the first determination unit 422 from determining the presence or absence of the ground fault. While the first determination unit 422 is prohibited from determining the presence or absence of the ground fault, the second determination unit 423 determines the presence or absence of the ground fault based on the second determination process regardless of the degree of deterioration of all the fuel cell stacks 12.

Thus, after it is found that it is difficult to accurately determine the presence or absence of ground fault of all the fuel cell stacks 12 all at once, the presence or absence of ground fault can be determined for each fuel cell stack 12 regardless of the degree of deterioration of all the fuel cell stacks 12. Therefore, the presence or absence of the ground fault of each fuel cell stack 12 can be continuously determined as quickly and accurately as possible.

According to the ground fault determination system 20 described above, it can be determined as quickly as possible whether there is the ground fault with all the fuel cell stacks 12. Further, according to the ground fault determination system described above, it can accurately be determined whether there is the ground fault with all the fuel cell stacks 12.

The determination result of the ground fault determination unit 42 (the first determination unit 422 and the second determination unit 423) may be notified to the driver of the fuel cell vehicle 10. In this way, the presence or absence of the ground fault can be notified to the driver before the fuel cell vehicle 10 starts moving.

The determination result of the ground fault determination unit 42 is displayed, for example, on a display device provided at the fuel cell vehicle 10. The display device is, for example, a liquid crystal display installed in a compartment of the fuel cell vehicle 10.

Figure 3:
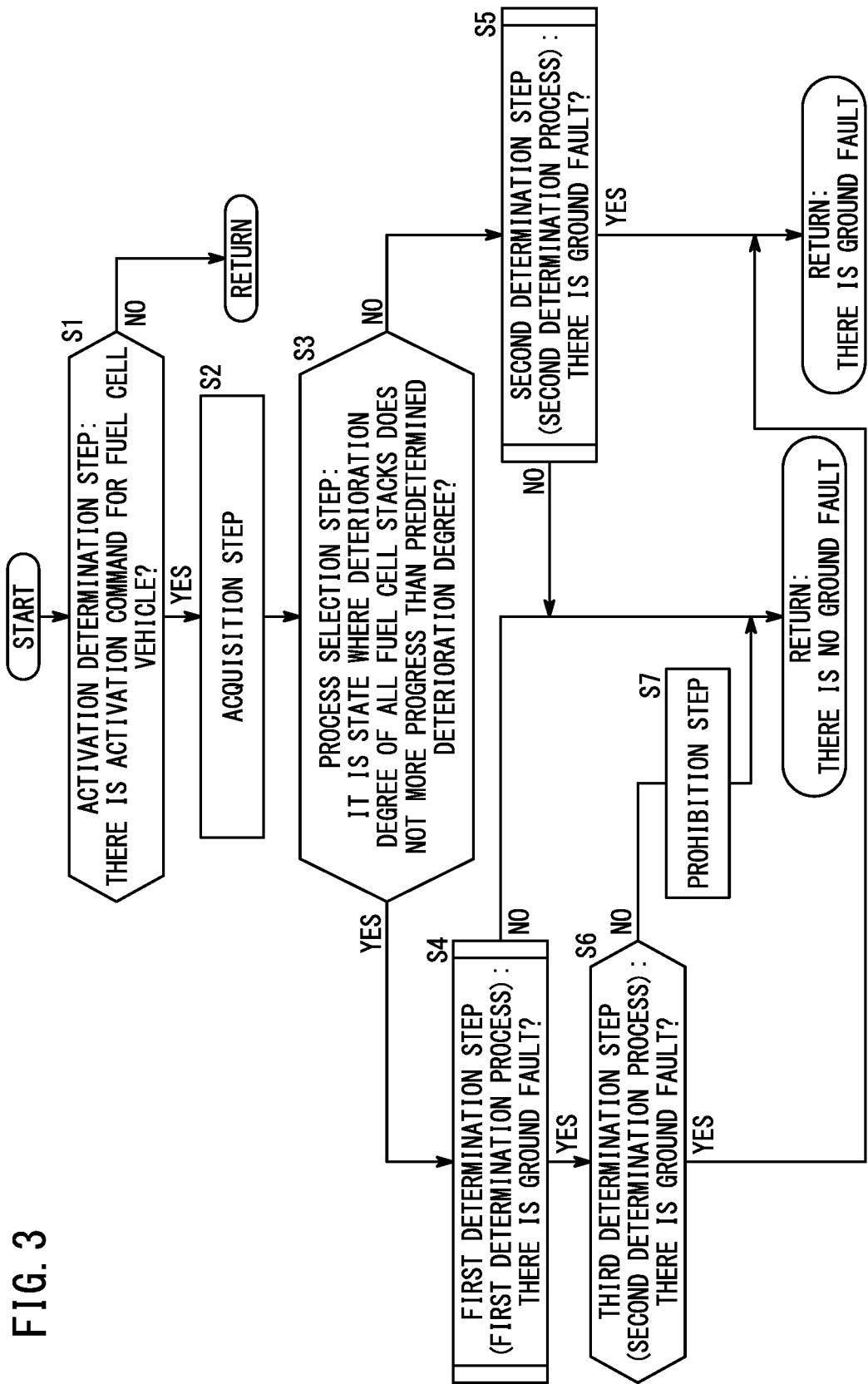
FIG. 3 is a flowchart illustrating the flow of a ground fault determination method according to the embodiment.

FIG. 3 is a flowchart illustrating the flow of a ground fault determination method according to the embodiment.

The ground fault determination system 20 can execute the ground fault determination method of FIG. 3. The ground fault determination method includes an activation determination step S1, an acquisition step S2, a process selection step S3, a first determination step S4, a second determination step S5, a third determination step S6, and a prohibition step S7.

In the activation determination step S1, the activation determination unit 38 determines whether the fuel cell vehicle has been activated. When the fuel cell vehicle 10 has been activated, the acquisition step S2 is executed.

In the acquisition step S2, the acquisition unit 40 acquires deterioration information. The deterioration information indicates the degree of deterioration of each of the plurality of fuel cell stacks 12.

In the process selection step S3, the process selection unit 421 determines whether the degree of deterioration of all the fuel cell stacks 12 is not more advanced than the predetermined degree of deterioration. The process selection unit 421 selects either one of the first determination process or the second determination process based on the determination result.

When the deterioration degree of all the fuel cell stacks 12 is not more advanced than the predetermined deterioration degree (S3: YES), the process selection unit 421 selects the first determination process. In this case, the first determination step S4 is executed after the process selection step S3. When the degree of deterioration of at least one fuel cell stack 12 is more advanced than the predetermined degree of deterioration (S3: NO), the process selection unit 421 selects the second determination process. In this case, the second determination step S5 is executed after the process selection step S3.

In the first determination step S4, the first determination unit 422 performs the first determination process.

FIG. 4 is a flowchart illustrating the flow of the first determination process performed in the first determination step S4.

The first determination step S4 includes a contactor control step S41 and a ground fault determination step S42.

FIG. 5A is a diagram showing the state of each contactor 22 before the contactor control step S41 is performed. FIG. 5B is a diagram showing the state of each contactor 22 after the contactor control step S41 is performed.

All contactors 22 are in an OFF state at the time immediately after the fuel cell vehicle 10 is activated (FIG. 5A). In the contactor control step S41, the contactor control unit 36 switches all the contactors 22 to the ON state in response to a request from the first determination unit 422 (FIG. 5B).

In the ground fault determination step S42, the first determination unit 422 determines whether there is a ground fault with all the fuel cell stacks 12. The presence or absence of the ground fault of each fuel cell stack 12 can be determined all at once, on the basis of the insulation resistance detected by the ground fault detection unit 26 when all the contactors 22 are in the ON state.

Therefore, when the first determination step S4 is executed, the presence or absence of the ground fault of all the fuel cell stacks 12 can be determined in a short time regardless of the number of the fuel cell stacks 12.

The determination result of the ground fault determination step S42 is handled as the determination result of the first determination step S4. When it is determined in the ground fault determination step S42 that all the fuel cell stacks 12 do not have the ground fault (S4: NO), the ground fault determination method ends. When it is determined in the ground fault determination step S42 that all the fuel cell stacks 12 have the ground fault (S4: YES), the third determination step S6 is executed after the first determination step S4.

In the second determination step S5, the second determination unit 423 performs the second determination process.

Figure 6:
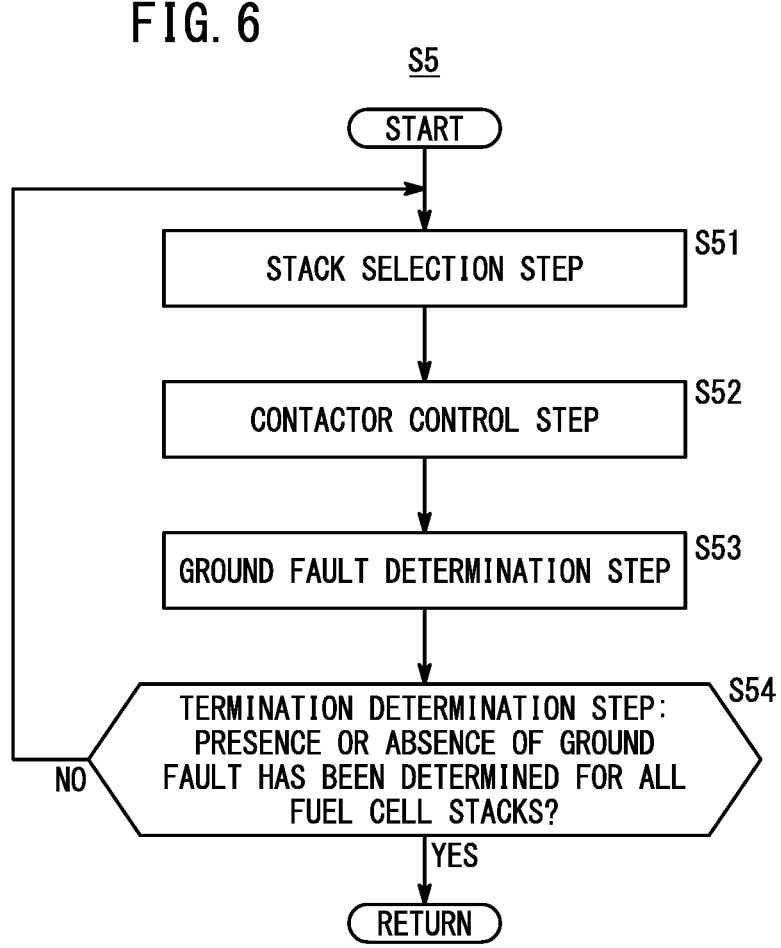
FIG. 6 is a flowchart illustrating a flow of a second determination process performed in a second determination step.

FIG. 6 is a flowchart illustrating the flow of the second determination process performed in the second determination step S5.

The second determination step S5 includes a stack selection step S51, a contactor control step S52, a ground fault determination step S53, and a termination determination step S54.

In the stack selection step S51, the second determination unit 423 selects one fuel cell stack 12 as a target for determining the presence or absence of ground fault. For example, a fuel cell stack 121 is selected first.

FIG. 7A is a diagram showing the state of each contactor 22 after the contactor control step S52 (first time) is performed. The state of each contactor 22 before the contactor control step S52 (first time) is performed is the same as the state in FIG. 5A.

In the contactor control step S52, the contactor control unit 36 switches the contactor 221 corresponding to the selected fuel cell stack 121 to the ON state in response to the request of the second determination unit 423.

In the ground fault determination step S53, the second determination unit 423 determines whether the selected fuel cell stack 12 has the ground fault.

In the end determination step S54, the second determination unit 423 determines whether the presence or absence of ground fault has been determined for all the fuel cell stacks 12.

If there are fuel cell stacks 12 left that have not yet been checked for a ground fault (S54: NO), the steps from the stack selection step S51 to the ground fault determination step S53 are executed again. However, in the stack selection step S51 that is executed again, the fuel cell stack 12 (122) that has not yet been checked for the ground fault is selected.

FIG. 7B is a diagram showing the state of each contactor 22 after the contactor control step S52 (second time) is performed.

In the second and subsequent contactor control steps S52, the contactor control unit 36 switches the contactor 222 corresponding to the newly selected fuel cell stack 122 to the ON state.

However, in the second and subsequent contactor control steps S52, the contactor control unit 36 also performs control to switch the contactor 22 (221), which has been switched to the ON state in the previous contactor control step S52, to the OFF state again. Thus, in the second and subsequent contactor control steps S52, only the selected fuel cell stack 12 among the plurality of fuel cell stacks 12 is electrically connected to the inverter 16.

When all the fuel cell stacks 12 have been checked for the ground fault (S54: YES), the second determination step S5 ends. When it is determined that there is a ground fault with at least one fuel cell stack 12, the determination result of the second determination step S5 is that there is a ground fault (S5: YES).

By executing the second determination step S5, it is possible to accurately determine whether each fuel cell stack 12 has the ground fault even when the deterioration of at least one of the plurality of fuel cell stacks 12 is developing. When the second determination step S5 ends, the ground fault determination method ends.

In the third determination step S6, similarly to the second determination step S5, the second determination unit 423 performs the second determination process (see also FIGS. 7A and 7B). Thus, when the occurrence of ground fault is suspected while the degree of deterioration of all the fuel cell stacks 12 is not more advanced than the predetermined degree of deterioration, the presence or absence of ground fault can be determined more accurately.

When the determination result of the third determination step S6 is the same as the determination result of the first determination step S4, the ground fault determination method ends. That is, when it is determined in the third determination step S6 that all the fuel cell stacks 12 have the ground fault, the ground fault determination method ends.

On the other hand, when the determination result of the third determination step S6 is different from the determination result of the first determination step S4, the prohibition step S7 is executed after the third determination step S6. That is, when it is determined in the third determination step S6 that at least one fuel cell stack 12 does not have the ground fault, the prohibition step S7 is executed.

In the prohibition step S7, the prohibition unit 44 prohibits the execution of the first determination step S4 when the ground fault determination method is performed in the future. In this case, when the ground fault determination method is performed in the future, only the second determination step S5 is performed out of the first determination step S4 and the second determination step S5. In this case, because the process selection unit 421 never selects the first process, the process selection step S3 may be skipped.

By executing the prohibition step S7, it is possible to continue to accurately determine whether there is the ground fault with each fuel cell stack 12.

After the prohibition step S7 is executed, the flow of the process of performing the first determination process (S4) and then performing the second determination process (S5) is prohibited. That is, re-execution of the determination process is prohibited. Thus, the time required for the ground fault determination method to be started after the execution of the prohibition step S7 is shortened.

Upon completion of the prohibition step S7, the ground fault determination method ends. The determination result of the ground fault determination method when the prohibition step S7 has been performed is the same as the determination result of the third determination step S6.

MODIFIED EXAMPLE

Modified examples of the above embodiments will be described below. However, the description that overlaps with the above embodiments will be omitted in the following description as much as possible. The components already explained in the above embodiments are denoted by the same reference numerals as those in the above embodiments unless otherwise specified.

Modified Example 1

Figure 8:
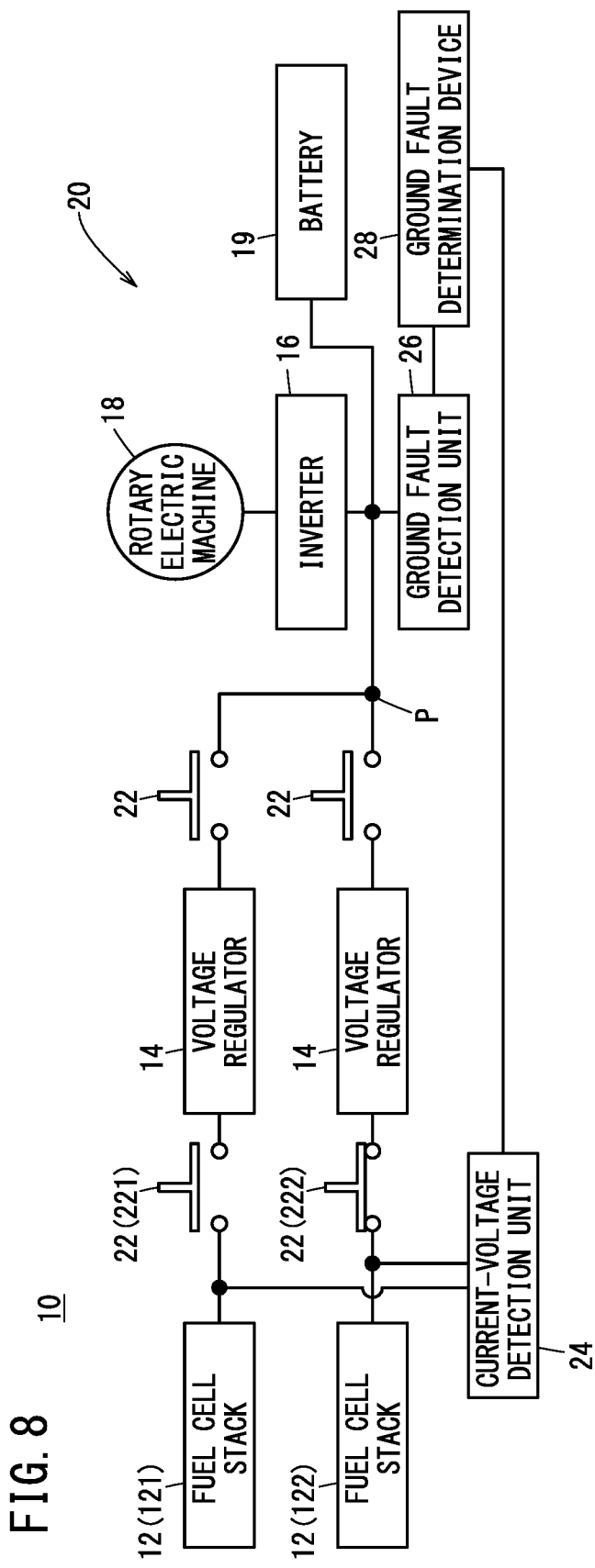
FIG. 8 is a block diagram of a fuel cell vehicle according to a first modified example.

FIG. 8 is a block diagram of the ground fault determination system 20 according to the first modified example.

A plurality of contactors 22 may be connected to each of the plurality of fuel cell stacks 12 in series. In this case, the plurality of contactors 22 may include a contactor 22 disposed between the fuel cell stack 12 and the voltage regulator 14 and a contactor 22 disposed between the voltage regulator 14 and the inverter 16.

According to this modified example, even if one of the plurality of contactors 22 corresponding to the same fuel cell stack 12 becomes uncontrollable while staying connected, the presence or absence of ground fault can be determined by switching the other contactors 22 to the OFF state.

Modified Example 2

The timing at which the ground fault determination system 20 determines whether there is the ground fault with the plurality of fuel cell stacks 12 is not limited to a case where the fuel cell vehicle 10 is activated.

For example, the ground fault determination system 20 may determine whether the plurality of fuel cell stacks 12 have the ground fault when the fuel cell vehicle 10 is stopped (the ignition is turned off). Whether the fuel cell vehicle 10 is stopped can be determined based on whether the ignition switch has been operated.

According to this modified example, each fuel cell stack 12 is checked for the ground fault also when the fuel cell vehicle 10 is stopped after each fuel cell stack 12 was checked for the ground fault when the fuel cell vehicle 10 was activated. As a result, it is possible to detect the ground fault of each fuel cell stack 12 at an early stage.

Combination of a Plurality of Modified Examples

The above-described plurality of modified examples may be appropriately combined within a range that does not contradict each other.

Invention Obtained from Embodiment

Hereinafter, the invention that can be understood from the above-described embodiments and modified examples will be described.

<First Invention>

The first invention is the ground fault determination system (20) that determines whether there is the ground fault with a plurality of fuel cell stacks (12) connected in parallel with each other and connected to an inverter (16), the ground fault determination system comprising: the acquisition unit (40) that acquires deterioration information indicating a degree of deterioration of each of the plurality of fuel cell stacks; the ground fault detection unit (26) that detects insulation resistance between the inverter and the plurality of fuel cell stacks; and the ground fault determination unit (42) that determines whether there is the ground fault, based on a detection result of the ground fault detection unit, wherein the ground fault determination unit includes: a first determination unit (422) that performs a first determination process in a case where the degree of deterioration of all the plurality of fuel cell stacks is not more advanced than a predetermined degree of deterioration; and the second determination unit (423) that performs a second determination process in a case where the degree of deterioration of at least one of the plurality of fuel cell stacks is more advanced than the predetermined degree of deterioration, the first determination process is a process of determining whether there is the ground fault with all the fuel cell stacks, based on a detection result of the ground fault detection unit acquired while all the fuel cell stacks are electrically connected to the inverter, and the second determination process is a process of determining, for each of the fuel cell stacks, whether there is the ground fault, based on a detection result of the ground fault detection unit acquired when each of the plurality of the fuel cell stacks is electrically connected to the inverter in turn.

Thus, the presence or absence of a ground fault in the plurality of fuel cell stacks can be determined as quickly as possible and accurately.

In a case where the first determination unit determines that there is the ground fault, even when the degree of deterioration of all the fuel cell stacks is not more advanced than the predetermined degree of deterioration, the second determination unit may determine whether there is the ground fault based on the second determination process. As a result, when the occurrence of ground fault is suspected while the degree of deterioration of all fuel cell stacks is not more than the predetermined degree of deterioration, the presence or absence of ground fault can be determined more accurately.

The ground fault determination unit may treat a determination result of the second determination unit as a correct determination result in a case where a determination result of the first determination unit and the determination result of the second determination unit are different from each other. Thus, even if the first determination unit makes an erroneous determination, a correct determination result can be obtained.

A first invention may be further provided with a prohibition unit (44) that prohibits the first determination unit from determining whether there is the ground fault in a case where the first determination unit determines that there is the ground fault and the second determination unit determines that there is no ground fault, wherein in a case where the first determination unit is prohibited from determining whether there is the ground fault, the second determination unit may determine whether there is the ground fault based on the second determination process regardless of the degree of deterioration of all the fuel cell stacks. Thus, the presence or absence of ground fault of each fuel cell stack can be continuously and accurately determined. Further, because the re-execution of the determination process is prohibited, the time required to obtain the final determination result concerning the presence or absence of the ground fault of each fuel cell stack is shortened.

The first invention may be provided to a fuel cell vehicle (10) that includes the inverter and the plurality of fuel cell stacks, and in a case where the fuel cell vehicle is activated, the ground fault determination system may determine whether there is the ground fault with the plurality of fuel cell stacks. Thus, whether the plurality of fuel cell stacks have the ground fault can be determined before the fuel cell vehicle starts moving.

<Second Invention>

The second invention is the ground fault determination method in which a computer determines whether there is a ground fault with a plurality of fuel cell stacks (12) connected in parallel with each other and connected to an inverter (16), based on a detection result of a ground fault detection unit (26) that detects insulation resistance between the inverter and the plurality of fuel cell stacks, the ground fault determination method comprising: the acquisition step (S2) of acquiring deterioration information indicating a degree of deterioration of each of the plurality of fuel cell stacks; the first determination step (S4) of performing a first determination process in a case where the degree of deterioration of all the plurality of fuel cell stacks is not more advanced than a predetermined degree of deterioration; and the second determination step (S5) of performing a second determination process in a case where the degree of deterioration of at least one of the plurality of fuel cell stacks is more advanced than the predetermined degree of deterioration, wherein the first determination process is a process in which the computer determines whether there is the ground fault with all the fuel cell stacks, based on a detection result of the ground fault detection unit acquired while all the fuel cell stacks are electrically connected to the inverter, and the second determination process is a process in which the computer determines, for each of the fuel cell stacks, whether there is the ground fault, based on a detection result of the ground fault detection unit acquired when each of the plurality of fuel cell stacks is electrically connected to the inverter in turn.

Thus, the presence or absence of the ground fault of the plurality of fuel cell stacks can be determined as quickly and accurately as possible.

The present invention is not limited to the above disclosure, and various modifications are possible without departing from the essence and gist of the present invention.

The invention claimed is:

1. A ground fault determination system that determines whether there is a ground fault with a plurality of fuel cell stacks connected in parallel with each other and connected to an inverter, the ground fault determination system comprising:
   an acquisition unit that acquires deterioration information indicating a degree of deterioration of each of the plurality of fuel cell stacks;
   a ground fault detection unit that detects insulation resistance between the inverter and the plurality of fuel cell stacks; and
   a ground fault determination unit that determines whether there is the ground fault, based on a detection result of the ground fault detection unit,
   wherein
   the ground fault determination unit includes:
      a first determination unit that performs a first determination process in a case where the degree of deterioration of all the plurality of fuel cell stacks is not more advanced than a predetermined degree of deterioration; and
      a second determination unit that performs a second determination process in a case where the degree of deterioration of at least one of the plurality of fuel cell stacks is more advanced than the predetermined degree of deterioration,
   the first determination process is a process of determining whether there is the ground fault with all the fuel cell stacks, based on a detection result of the ground fault detection unit acquired while all the fuel cell stacks are electrically connected to the inverter, and
   the second determination process is a process of determining, for each of the fuel cell stacks, whether there is the ground fault, based on a detection result of the ground fault detection unit acquired when each of the plurality of the fuel cell stacks is electrically connected to the inverter in turn.

2. The ground fault determination system according to claim 1, wherein
   in a case where the first determination unit determines that there is the ground fault, even when the degree of deterioration of all the fuel cell stacks is not more advanced than the predetermined degree of deterioration, the second determination unit determines whether there is the ground fault based on the second determination process.

3. The ground fault determination system according to claim 2, wherein
   the ground fault determination unit treats a determination result of the second determination unit as a correct determination result in a case where a determination result of the first determination unit and the determination result of the second determination unit are different from each other.

4. The ground fault determination system according to claim 3, further comprising a prohibition unit that prohibits the first determination unit from determining whether there is the ground fault in a case where the first determination unit determines that there is the ground fault and the second determination unit determines that there is no ground fault, wherein in a case where the first determination unit is prohibited from determining whether there is the ground fault, the second determination unit determines whether there is the ground fault based on the second determination process regardless of the degree of deterioration of all the fuel cell stacks.

5. The ground fault determination system according to claim 1, wherein the ground fault determination system is provided to a fuel cell vehicle that includes the inverter and the plurality of fuel cell stacks, and in a case where the fuel cell vehicle is activated, the ground fault determination system determines whether there is the ground fault with the plurality of fuel cell stacks.

6. A ground fault determination method in which a computer determines whether there is a ground fault with a plurality of fuel cell stacks connected in parallel with each other and connected to an inverter, based on a detection result of a ground fault detection unit that detects insulation resistance between the inverter and the plurality of fuel cell stacks, the ground fault determination method comprising:

acquiring deterioration information indicating a degree of deterioration of each of the plurality of fuel cell stacks;

performing a first determination process in a case where the degree of deterioration of all the plurality of fuel cell stacks is not more advanced than a predetermined degree of deterioration; and performing a second determination process in a case where the degree of deterioration of at least one of the plurality of fuel cell stacks is more advanced than the predetermined degree of deterioration, wherein the first determination process is a process in which the computer determines whether there is the ground fault with all the fuel cell stacks, based on a detection result of the ground fault detection unit acquired while all the fuel cell stacks are electrically connected to the inverter, and the second determination process is a process in which the computer determines, for each of the fuel cell stacks, whether there is the ground fault, based on a detection result of the ground fault detection unit acquired when each of the plurality of fuel cell stacks is electrically connected to the inverter in turn.

* * * * *